United States Patent [19]

Sperling

[11] Patent Number: 4,675,354

[45] Date of Patent: Jun. 23, 1987

[54] GLUE SOLUTION

[75] Inventor: Bent Sperling, Niva, Denmark

[73] Assignee: A/S F. Heimann & Co., Kvistgaard, Denmark

[21] Appl. No.: 820,889

[22] PCT Filed: Nov. 17, 1983

[86] PCT No.: PCT/DK83/00108

§ 371 Date: Jul. 20, 1984

§ 102(e) Date: Jul. 20, 1984

[87] PCT Pub. No.: WO84/02142

PCT Pub. Date: Jun. 7, 1984

Related U.S. Application Data

[63] Continuation of Ser. No. 637,045, Jul. 20, 1984, abandoned.

[30] Foreign Application Priority Data

Dec. 1, 1982 [DK] Denmark ............................ 5342/82

[51] Int. Cl.$^4$ ............................ C09J 3/16; C09J 3/00; C09J 3/14

[52] U.S. Cl. ...................................... 524/99; 156/297; 156/327; 156/330.9; 156/332; 524/104; 524/110; 524/111; 524/527; 524/565; 524/567

[58] Field of Search ................. 524/99, 104, 110, 111, 524/527, 565, 567; 156/297, 327, 330.9, 332

[56] References Cited

U.S. PATENT DOCUMENTS

| T903,023 | 10/1972 | Hunter | 524/110 |
|---|---|---|---|
| 2,616,868 | 11/1952 | Heisenberg et al. | 524/112 |
| 2,957,206 | 10/1960 | Mindick et al. | 524/111 |
| 2,958,614 | 11/1960 | Perry | 524/111 |
| 3,404,117 | 10/1968 | Uffner | 524/111 |
| 4,010,143 | 3/1977 | Flowers | 524/104 |

FOREIGN PATENT DOCUMENTS

| EP46957 | 3/1982 | European Pat. Off. | 111/ |
|---|---|---|---|
| 2227349 | 12/1972 | Fed. Rep. of Germany | 524/111 |
| 2,253,361 | 5/1974 | Fed. Rep. of Germany | 524/111 |
| 57-185369 | 11/1982 | Japan . | |
| 854953 | 11/1960 | United Kingdom | 524/111 |
| 867278 | 5/1961 | United Kingdom | 524/111 |
| 1572481 | 7/1980 | United Kingdom | 524/141 |

OTHER PUBLICATIONS

*NMP Handbook*, GAF Corporation, copyright 1972, pp. 35–39, 47, and Table of Contents.

*Primary Examiner*—Ronald W. Griffin
*Attorney, Agent, or Firm*—Birch, Stewart, Kolasch & Birch

[57] ABSTRACT

A glue is disclosed which comprises a solution of at least one water-insoluble synthetic organic polymer, such as PVC or ABS, in a solvent which essentially consists of one or several compounds selected from the group consisting of 5- or 6-membered water-miscible lactones or lactams having a melting point of at the most $-10°$ C., a boiling point of at least $200°$ C. and a flash point of at least $90°$ C., such as N-methyl-2-pyrrolidone or $\gamma$-butyrolactone. The polymer or polymers may be present in a concentration of between 0.5 and 50% by weight, in particular about 10% by weight.

The glue may be used at tropical temperatures without problems arising from solvent vapours and without fire risks. The glue is particularly useful for gluing soft PVC articles to hard PVC articles without loss of the soft character of the soft PVC, and for gluing different polymers, such as PVC on polycarbonate or polycarbonate on polyacrylate.

24 Claims, No Drawings

GLUE SOLUTION

FIELD OF THE INVENTION

The present invention relates to novel glues for joining articles made from water-insoluble synthetic organic polymer materials.

DESCRIPTION OF THE PRIOR ART

The use of polymer materials in e.g. the building industry has had as a consequence that it is necessary to join, by gluing, prefabricated or fitted articles mainly made from PVC or ABS. Examples of such componenets are roof gutters, roofings, window frames or PVC tubing for tap water or sewage junctions.

The types of glue commonly used so far practically all consist of a 10-30% by weight solution of PVC in one or several of the following solvents: Butylacetate, cyclohexanone, dimethylformamide or tetrahydrofuran. These solvents all have a relatively low boiling point and/or flash point and are hazardous to the health when inhaled and, in varying degrees, by skin contact. Thus, official safety demands dictated by the fire hazards involved and official demands dictated by the occupational hazards involved are so strict that the compliance to such demands renders the use of such solvents costly and in some instances almost impossible.

Furthermore, all directions for use of currently available glues demand at the very least a careful de-greasing of the components with a de-greasing agent, normally of the same type as the thinner recommended for the glue, thus further subjecting the user to skin contact with a solvent and solvent vapours.

Technically, the low boiling point of most of the currently used solvents leads to problems when gluing at elevated temperatures or in strong sunlight, such as the gluing of PVC tubes in subtropical or tropical region where it is common that such gluing operations can only be carried out at night.

SUMMARY OF THE INVENTION

The present invention obviates or substantially reduces the abovediscussed disadvantages of the glues according to the prior art both as regards flammability, occupational hazards and environmental problems, and difficulties in connection with gluing at elevated temperatures.

The invention relates to a glue comprising a solution of at least one water-insoluble synthetic organic polymer in a solvent which essentially consists of one or several compounds selected from the group consisting of 5- or 6-membered water-miscible lactones or lactams having a melting point of at the most $-10°$ C., a boiling point of at least 200° C. and a flash point of at least 90° C.

The invention further relates to a method for making a glued joint between surfaces of articles made from a material comprising water-insoluble synthetic organic polymers, said method comprising applying a glue as defined above on at least one of the surfaces to be joined, joining the surfaces and allowing the joint to develop.

DETAILED DESCRIPTION OF THE INVENTION

Among the lactams, N-alkylated lactams, in particular N-methylated lactams are preferred, since N-alkylated lactams have lower melting points than N-unsubstituted lactams.

In the present context, the term "alkylated" designates substitution with a $C_{1-4}$ alkyl group which may be straight or branched, such as methyl, ethyl, propyl, isopropyl, butyl and tert.butyl.

Preferred lactones are lactones which are either unsubstituted or alkylated in the 4- or 5-position.

The lactams may be unsubstituted on the ring carbon atoms or alkylated in the 4- or 5- position.

As examples of 5- or 6-membered water-miscible lactones or lactams having a melting point at the most $-10°$ C. and a boiling point of a least 200° C. may be mentioned N-methyl-2-pyrrolidone (also known as NMP), butyrolactone, N,5-dimethyl-2-pyrrolidone, $\gamma$-valerolactam, $\gamma$-valerolactone and $\gamma$-caprolactone.

A preferred lactam is N-methyl-2-pyrrolidone, and a preferred lactone is $\gamma$-butyrolactone. Each of these preferred solvents may be used per se, or a mixture thereof may be used. N-methyl-2-pyrrolidone is especially preferred because of its low toxicity ($\geq 7$ g/kg in rats).

In the present context, the term "essentially consists of" indicates that apart from one or several of the lactones or lactams indicated, the solvent is preferably free of any substantial amounts of other solvents, but it will be realized that minor amounts of other solvents, even solvents not fulfilling the criteria set out above, may be added to the solvents used in the glues according to the invention without substantially impairing the abovementioned performance qualities, and such admixtures are within the scope of the present invention.

The polymer or polymer mixture dissolved in the solvent to form the glue of the invention may be any water-insoluble synthetic organic polymer which is soluble in the lactam or lactone solvent to yield an effective polymer glue. As examples of polymers which may be used may be mentioned PVC, ABS, polyacrylate, polycarbonate, cellulose acetate, polyacrylamide, polyamide and polystryrene. Among these, PVC and ABS are especially important due to their widespread use in articles destined for the building, construction and plumbing fields, etc. The polymer or polymer mixture dissolved in the solvent to form the glue of the present invention may be newly made polymer, or it may be polymer waste from the production of polymer articles.

As a general rule, the polymer or polymers in a glue is/are preferably identical or substantially identical to the polymer or polymers which are to be joined by means of the glue in question. In other words, the polymer in a glue for gluing PVC is preferably PVC, the polymer in a glue for gluing ABS is preferably ABS, etc. However, it has also been found that two different polymer materials may be glued by means of a glue according to the invention which comprises only one of the polymers. Thus, both soft and hard PVC may be glued onto polycarbonate by means of a 10% solution of polycarbonate in NMP, and polycarbonate may be glued onto polyacrylate by means of a 10% solution of polycarbonate in NMP.

For use in the various applications the viscosity of the glue may be adjusted within a wide range by increasing or decreasing the concentration of the polymer or polymers in the glue. The polymer or polymers are preferably present in the glue according to the invention in a concentration between 0.5 and 50% by weight, or preferably a concentration between 2 and 40% by weight, usually between 3 and 30% by weight. For most practical applications, a suitable glue will contain the polymer or polymers in a concentration of between 5 and 20%, in particular 8 and 16% such as about 10%, by weight.

If desired, a thixotropic agent such as colloidal silica may be incorporated in the glue according to the present invention in order to avoid dripping of the glue without resorting to an otherwise undesired high concentration of the polymer or polymers. The colloidal silica may, for example, be of the type sold under the trademarks "Aerosil®" (from Degussa, BRD) or "HDK" (from Wacker Chemie, BRD) and may be incorporated in any suitable amounts such as from about 0.1 to about 3% by weight. Also, a viscosity-adjusting agent may be incorporated, such as baryte in a concentration of from 1 to 10% by weight, a di-2ethylhexylamine-neutralized carboxyvinyl polymer (such as "Carbopol" 934 from Goodrich Chemicals) in a concentration of from about 0.5 to about 1% by weight, or a hydroxyethyl cellulose (such as "Cellosize" QP 100M from Union Carbide) in a concentration of from about 0.5 to about 2% by weight.

One of the advantages of the glue according to the invention is that it permits the gluing of components which were not, in the prior art, easily gluable by means of the known compositions.

As examples of such systems which are now easily gluable may be mentioned gluing of soft or softened PVC to hard PVC where prior art glues based on conventional solvents often failed, probably due to undesired interaction with the plasticizers in the soft PVC. According to the invention this permits e.g. the easy gluing of soft PVC hoses to hard PVC fittings in connection with the installation of e.g. swimming pools, or in connection with the construction of laboratory apparatus (gluing of soft PVC hoses to hard PVC tubes, in dishwashers, washing machines, etc.).

A further possibility is the gluing or repair of soft PVC articles where a glue according to the invention may be constructed with a sufficient body and viscosity to fill cracks or fissures and other irregularities and join them to attain the original dense structure, with retention of the general soft character of the original article. This is ascribable to the characteristics of the glue of the invention to the effect that it does not interfere with or extract plasticizer from the PVC, in contrast to conventional glues, the solvents of which are also much more efficient solvents of the plasticizer.

In a textbook on NMP (cf. "NMP, N-methyl-2-pyrrolidone Handbook", GAF Corporation, N.Y. 1972, page 47), it is mentioned that NMP may improve performance in such applications as rubber and vinyl cements, and it is also suggested to use NMP as a solvent welding agent. The textbook, however, does not state or indicate that NMP may be used as the sole or substantially the sole solvent in glues, and the mention of NMP as a solvent welding agent does not anticipate the use of NMP as a glue solvent. The technology of gluing is distinct from welding of plastics in many regards: Firstly, gluing does not solely depend upon dissolution of the plastic parts to be joined. Secondly, gluing will serve to fill voids between the articles to be joined because of the body constituted by the solid contents of the glue itself. Thirdly, solvent welding cannot be used in practice in several applications beacuse the solvent would tend to drip or spread over a too large area. Fourthly, solvent welding would tend to apply too much solvent at the junction with the result that the polymer material adjacent to the joint would soften to a too high degree and it would take a too long period before the full strength had been developed through migration of the solvent.

The invention is illustrated in the following non-limiting examples.

EXAMPLE 1

Preparation of an NMP-based glue containing PVC

In a closed vessel 10% by weight of PVC-granulate (trademark Vinnol® from Wacker Chemie, BRD) are added to NMP at room temperature under vigorous stirring until a homogeneous solution is obtained.

EXAMPLE 2

Preparation of an NMP-based glue containing PVC-waste

In a closed vessel 10% by weight of PVC granulate (made from waste from the production of hard PVC articles) are added to NMP under vigorous stirring at room temperature until a homogeneous solution is obtained.

EXAMPLE 3

Preparation of an NMP-based glue containing ABS

By following the procedure described in Examples 1 and 2, but substituting ABS granulate for PVC granulate, a solution of 10% by weight of ABS in NMP is prepared.

EXAMPLE 4

Preparation of an NMP-based glue containing PVC and ABS

By following the procedure described in Examples 1 and 2 a solution of 5 parts by weight of PVC granulate and 5 parts by weight of ABS granulate in 90 parts by weight of NMP is prepared.

EXAMPLE 5

Pressure testing of glued joints

From a length of PVC-tube with a nominal diameter of about 50 mm were cut two pieces with a length of about 50 cm. To each of the four ends of the two pieces of tubing were glued a closed tube sleeve with an inside diameter of about 50.5 mm. One of the sleeves of each length of tube was fitted with a pressure coupling and a manometer. The gluing was performed by means of a 10% by weight solution of PVC in N-methyl-2-pyrrolidone prepared as described in Example 1. The gluing was performed by applying a thin layer of glue to the outside surface of the tube end about 3 cm up the length of the tube, fitting the sleeve over the end of the tube, rotating the sleeve on the tube end to distribute the glue and leaving the joints to set.

Tube No. 1 had a diameter at one end of between 50.0 mm and 50.2 mm and at the other end of between 50.0 mm and 50.2 mm, which ends were fitted with closed sleeves with an inside diameter of 50.5 mm and 50.4 mm, respectively, thus providing joints with a gap between the surfaces of 0.3–0.5 mm and 0.2–0.4 mm, respectively. After the glue had been applied and the sleeves fitted, the glue was allowed to set for 4 hours at room temperature. Thereafter, the gluing was pressure tested at 10 kg/cm$^2$ water pressure for 15 minutes and thereafter at 19–20 kg/cm$^2$ water pressure for 15 minutes. No leaks were observed.

Tube No. 2 had end diameters of 49.9–50.3 mm and 49.9–50.3 mm, and the ends were fitted with closed sleeves with inside measures of 50.5 mm and 50.3–50.5 mm, respectively, thus producing joints with a gap between the surfaces of 0.2–0.6 mm and 0.2–0.6 mm, respectively. The sleeves were glued to the tube in the same manner as above, and the glue was allowed to set for 4 hours at room temperature. Pressure testing was performed at 8 kg/cm$^2$ water pressure for 15 minutes followed by 19–20 kg/cm$^2$ water pressure for 15 minutes. No leaks were observed.

EXAMPLE 6

Gluing of soft PVC onto hard PVC

To the outside surface of the end of a piece of hard PVC tube (outside diameter 16 mm) a glue prepared according to Example 1 was applied ca. 1 cm up the length of the tube. A piece of soft PVC hose (inside diameter 13 mm) was thereafter fitted over the end of the tube and rotated slightly to distribute the glue, whereafter the glue was allowed to set. The gluing showed no cracking or brittling of the hose, and it was not possible to pull the hose off.

I claim:

1. A method for making a glued joint between surfaces of articles made from a material comprising water-insoluble synthetic organic polymers, said method comprising applying a glue solution which consists essentially of a solvent of at least one 5- or 6-membered water-miscible lactone or lactam having a melting point not greater than −10° C., a boiling point of at least 200° C. and a flash point of at least 90° C., and at least one water-insoluble synthetic or natural organic polymer dissolved therein, on at least one of the surfaces to be joined; joining said surfaces; and allowing a joint to develop.

2. The method as claim in claim 1 wherein the lactams are N-alkylated.

3. The method as claimed in claim 2, wherein the N-alkylated lactam is an N-methylated lactam.

4. The method as claimed in claim 1, wherein the lactones are unsubstituted or alkylated in the 4- or 5-position.

5. The method as claimed in claim 2, wherein the lactams are unsubstituted on the ring carbons or alkylated in the 4- or 5-position.

6. The method as claimed in claim 2, wherein the solvent consists of a mixture of N-methyl-2-pyrrolidone and γ-butyrolactone.

7. The method as claimed in claim 1, wherein the solvent consists of N-methyl-2-pyrrolidone.

8. The method as claimed in claim 1, wherein the solvent consists of γ-butyrolactone.

9. The method as claimed in claim 1, wherein the polymer is at least one member selected from the group consisting of PVC, ABS, polyacrylate, polycarbonate, cellulose acetate, polyacrylamide, polyamide and polystyrene.

10. The method as claimed in claim 9, wherein the polymer is PVC.

11. The method as claimed in claim 9, wherein the polymer is ABS.

12. The method as claimed in claim 9, wherein the polymer is a mixture of PVC and ABS.

13. The method as claimed in claim 9, wherein the polymer or polymers is/are present in a concentration of between 0.1 and 50% by weight.

14. The method as claimed in claim 13, wherein the polymer or polymers is/are present in a concentration of between 3 and 30% by weight.

15. The method as claimed in claim 14, wherein the polymer or polymer is/are present in a concentration of between 5 and 20% by weight.

16. The method as claimed in claim 15, wherein the polymer or polymers is/are present in a concentration of between 8 and 16% by weight.

17. The method as claimed in claim 16, wherein the polymer or polymer is/are present in a concentration of about 10% by weight.

18. The method as claimed in claim 1, wherein the glue solution consists essentially of N-methyl-2-pyrrolidone solvent and PVC dissolved therein.

19. The method as claimed in claim 18, wherein the ariticle is made of PVC.

20. The method as claimed in claim 1, wherein the glue solution further contains a thixotropic agent.

21. The method as claimed in claim 20, wherein the thixotropic agent is colloidal silica.

22. The method as claimed in claim 1, wherein the glue solution further contains a viscosity-adjusting agent.

23. A glue solution which consists essentially of γ-butyrolactone and at least one water-insoluble synthetic or natural organic polymer dissolved therein.

24. A glue solution which consists essentially of a solvent of at least one 5- or 6-membered water-miscible lactone or lactam having a melting point not greater than −10° C., a boiling point of at least 200° C. and a flash point of at least 90° C.; and a polymer selected from the group consisting of polyacrylate, polyacrylamide, polyamide, polystyrene, cellulose acetate, ABS or a mixture of ABS and PVC dissolved therein.

* * * * *

UNITED STATES PATENT AND TRADEMARK OFFICE
CERTIFICATE OF CORRECTION

PATENT NO. : 4,675,354

DATED : June 23, 1987

INVENTOR(S) : Bent Sperling

It is certified that error appears in the above-identified patent and that said Letters Patent is hereby corrected as shown below: On the title page In the category "[87] PCT Pub. No.:" change "WO84/02142" to

--WO84/02143--

Signed and Sealed this

Twenty-fourth Day of November, 1987

Attest:

DONALD J. QUIGG

*Attesting Officer*  *Commissioner of Patents and Trademarks*